United States Patent [19]

Elqadah et al.

[11] Patent Number: 5,727,810
[45] Date of Patent: Mar. 17, 1998

[54] ONE-PIECE CONSTRUCTION PLASTIC AIRBAG CUSHION RETAINER WITH INTEGRAL FASTENERS

[75] Inventors: Wael S. Elqadah, North Ogden; John L. Sabin, Kaysville, both of Utah; Haig H. Kassouni, Grand Rapids; Timothy Grabill, Howard City, both of Mich.

[73] Assignees: Morton International, Inc., Chicago, Ill.; Agape Plastics, Inc., Grand Rapids, Mich.

[21] Appl. No.: 543,902

[22] Filed: Oct. 17, 1995

(Under 37 CFR 1.47)

[51] Int. Cl.⁶ .................................................. B60R 21/16
[52] U.S. Cl. ............................................... 280/728.2
[58] Field of Search ........................ 280/728.2, 731, 280/728.1

[56] References Cited

U.S. PATENT DOCUMENTS

| | | |
|---|---|---|
| D. 356,729 | 3/1995 | Kassouni . |
| 1,867,354 | 7/1932 | Dickson . |
| 3,584,667 | 6/1971 | Reiland . |
| 4,753,560 | 6/1988 | Ryder .................. 411/82 |
| 4,988,119 | 1/1991 | Hartmeyer ............ 280/728.2 |
| 5,176,400 | 1/1993 | McGuire et al. ...... 280/728.2 |
| 5,193,846 | 3/1993 | Allard ................... 280/728.2 |
| 5,195,774 | 3/1993 | Morita .................. 280/728.2 |
| 5,358,270 | 10/1994 | Kuretake et al. ..... 280/728.2 |
| 5,407,310 | 4/1995 | Kassouni .............. 411/107 |
| 5,443,284 | 8/1995 | Strahl et al. .......... 280/728.2 |

FOREIGN PATENT DOCUMENTS 2173564  10/1986  United Kingdom .

*Primary Examiner*—Peter C. English
*Attorney, Agent, or Firm*—Ohlandt, Greeley, Ruggiero, & Perle; George W. Rauchfuss

[57] ABSTRACT

A one-piece construction airbag cushion retainer having an annular ring and a plurality of integral fasteners. The annular ring is fabricated of reinforced plastic and has a bottom surface. The plurality of fasteners each have heads insert-molded or welded into the annular ring and studs extending from the bottom surface of the annular ring for securing an airbag cushion to an airbag module assembly.

23 Claims, 4 Drawing Sheets

ONE-PIECE CONSTRUCTION PLASTIC AIRBAG CUSHION RETAINER WITH INTEGRAL FASTENERS

FIELD OF THE INVENTION

The present invention relates to an airbag cushion retainer for use with an airbag module assembly. More particularly, the present invention relates to a one-piece construction airbag cushion retainer having a reinforced plastic annular ring and insert-molded or welded integral fasteners.

BACKGROUND OF THE INVENTION

Providing a light weight, inexpensive, yet strong, one-piece construction airbag cushion retainer with integral fasteners would be useful. Airbag cushion retainers are used in airbag modules that are in turn used in inflatable restraint systems. Inflatable restraint systems are employed in automobiles for protecting an occupant against injury by physically restraining the occupant's body when the automobile encounters a collision.

The airbag module assembly normally includes an airbag cushion, an inflator and a module base plate. The module base plate has an inflator-receiving hole with the inflator extending therethrough. The inflator also has a radially extending peripheral bracket positioned against the base plate. The airbag cushion has an open mouth formed by a collar that fits over the inflator with the collar positioned against the base plate. An airbag cushion retainer then secures the airbag cushion to the base plate and inflator. The inflator, once triggered by a remote collision sensor, provides the inflation gas for inflating the airbag cushion.

The airbag cushion retainer must be of considerable strength. It has been determined that to protect a driver during a collision the airbag cushion should inflate within 20 to 40 milliseconds after the initial impact. The inflation gas supplied to the airbag cushion, necessarily under high pressure to inflate the airbag within that short time, produces forces which tend to pull and separate the airbag from its mounting. Because of these excessive forces, an airbag cushion retainer of considerable strength must be provided to insure the integrity of the airbag cushion mounting.

As with all components used in automobiles, the airbag cushion retainer should also be as light as possible. Lighter components save material, reduce manufacturing costs and, most importantly, contribute to increased automobile fuel efficiency. An airbag cushion retainer should accordingly be as light as possible besides being of considerable strength.

One prior art airbag cushion retainer, shown and described in U.S. Pat. No. 5,193,846, is a steel annular ring that fits over the airbag cushion, around the inflator and is superimposed on the collar. The steel annular ring is fastened to the assembly using separate bolts or other, similar, fasteners. Although this retainer performs well and provides excellent strength, its steel construction is relatively heavy. In addition, the need to attach the retainer using separate fasteners complicates and adds considerably time to assembling the airbag module.

In an effort to simplify the airbag cushion retainer, another prior art airbag module, shown and described in U.S. Pat. No. 5,176,400, incorporates a steel retaining ring having insert-molded fasteners. Although this retainer ring simplifies the airbag module assembly, it is still relatively heavy and costly. Accordingly, providing a light weight, inexpensive, yet strong, one-piece construction airbag cushion retainer with integral fasteners would still be useful.

SUMMARY OF THE INVENTION

An object, therefore, of the present invention is to provide a light weight, inexpensive, one-piece construction airbag cushion retainer with integral fasteners.

An additional object of the present invention is to provide a light weight one-piece construction airbag cushion retainer with integral fasteners of sufficient strength to secure an airbag cushion during inflation thereof.

In carrying out this invention, there is provided a one-piece construction airbag cushion retainer having an annular ring and a plurality of integral fasteners. The annular ring is fabricated of reinforced plastic and has a bottom surface. The plurality of fasteners each have heads insert-molded or welded into the annular ring and studs extending from the bottom surface of the annular ring.

According to another aspect of the invention, the one-piece construction airbag cushion retainer is incorporated into an airbag module assembly. The airbag module assembly includes a module base plate, an airbag cushion and an inflator. The module base plate has an inner marginal edge forming an inflator-receiving hole, and the airbag cushion has an open mouth formed by a collar that is positioned adjacent the inner marginal edge of the module base plate. The inflator is positioned within the inflator-receiving hole of the module base plate, extends into the open mouth of the airbag cushion and has a radially extending peripheral bracket that is positioned adjacent the module base plate. The collar of the airbag cushion, the marginal edge of the module base plate and the peripheral bracket of the inflator each have a plurality of corresponding fastener-receiving holes.

The annular ring of the one-piece construction airbag cushion retainer fits around the inflator with its bottom surface above the inner marginal edge of the module base plate and superimposed over the collar of the airbag cushion. The studs extending from the bottom surface of the annular ring pass through the corresponding fastener-receiving holes of the collar of the airbag cushion, the marginal edge of the module base plate and the peripheral bracket of the inflator to secure the airbag cushion to the module assembly and are secured by conventional nuts or other suitable means.

According to additional aspects of the invention, the plastic annular ring is reinforced with glass, the glass is provided in long or short fibers and the plastic is nylon. In accordance with further aspects of the present invention, the glass fibers preferably comprise at least 40 percent of the plastic annular ring and the glass fibers are preferably at least 15 millimeters in length.

The present invention therefore provides a light weight, inexpensive, yet strong, one-piece construction airbag cushion retainer with integral fasteners.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
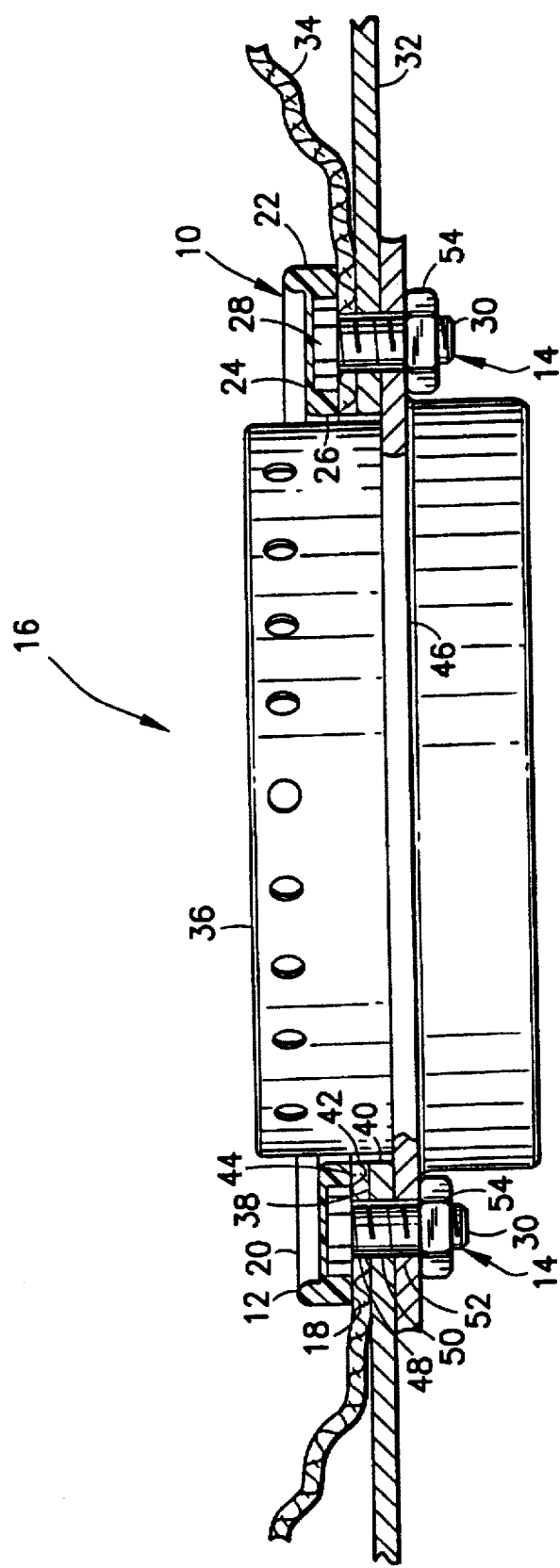
FIG. 1 is a side elevation view, partially in section, of an airbag module assembly incorporating an airbag cushion retainer according to the present invention.
Figure 2:
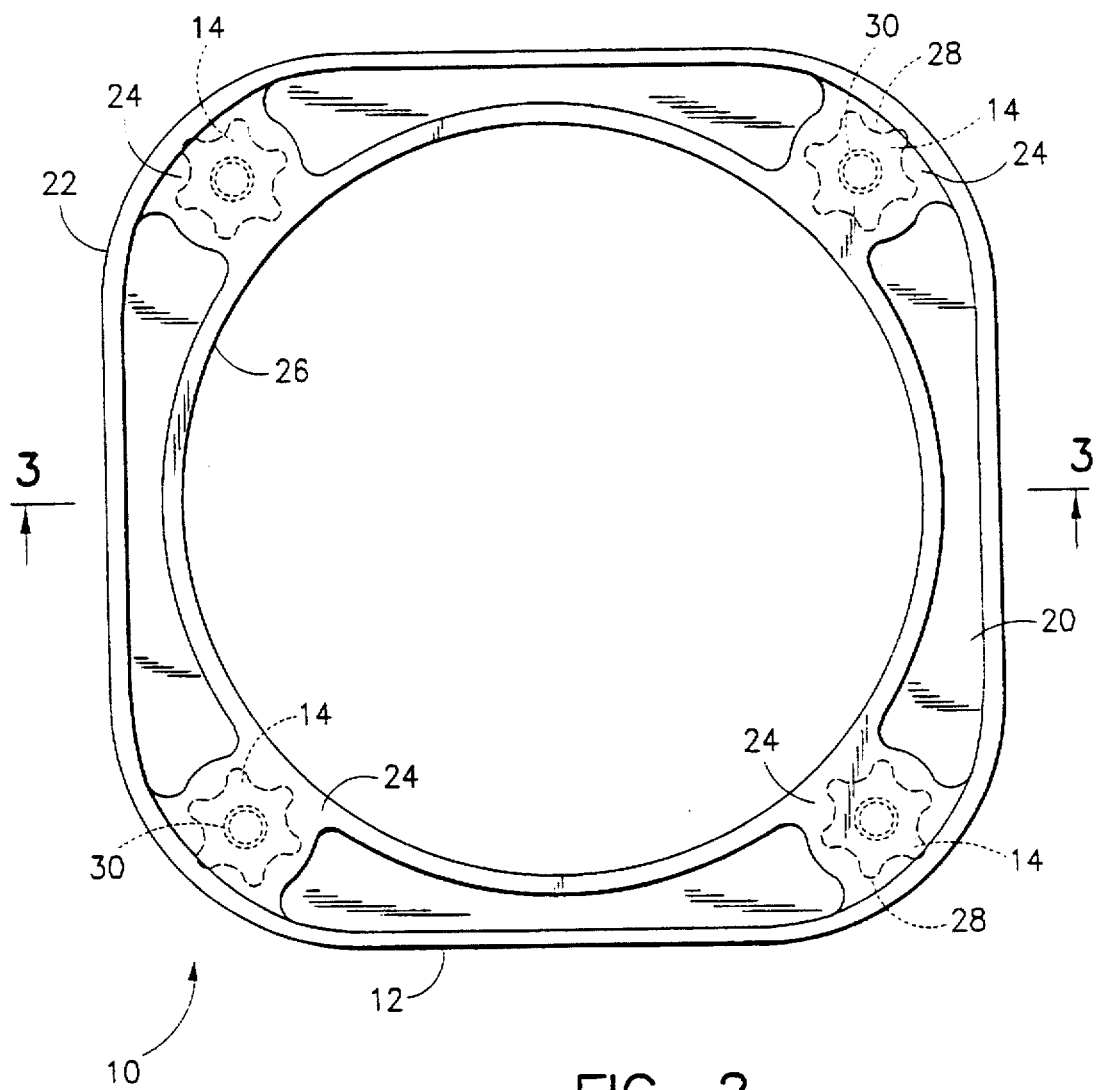
FIG. 2 is a top elevation view of the airbag cushion retainer of FIG. 1.
Figure 3:
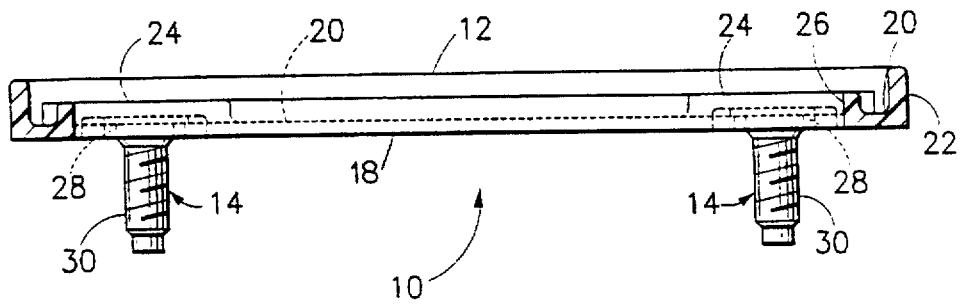
FIG. 3 is a cross-sectional view of the airbag cushion retainer of FIGS. 1 and 2, taken along the line 3—3 of FIG. 2.

Referring first to FIGS. 1 through 3, the present invention is directed to a one-piece construction airbag cushion retainer, generally represented by the reference numeral 10, having an annular ring 12 and a plurality of integral fasteners 14. The airbag cushion retainer 10 is incorporated in an airbag module assembly, generally represented by the reference numeral 16.

The annular ring 12 has a bottom surface 18 and a top surface 20 that is relieved to remove excess material and reduce the weight of the annular ring 12. The annular ring 12 further has a generally rectangular outer periphery 22 encompassing four corner areas 24 and a generally circular inner periphery 26.

The annular ring 12 is fabricated from injection molded glass-reinforced nylon containing at least 30 percent long glass fibers, the glass fibers preferably having a length of at least 10 millimeters and more preferably at least 15 millimeters. The annular ring 12 may also be comprised of a number of other suitable plastics. For example, suitable polyphthalamides (PPA), polyphenylene sulfides (PPS), acrylonitrile-butadiene-styrenes (ABS), polycarbonates or polyesters such as polybutylene terephthalate (PBT), or the like may be used. Preferably though, nylon 6 or 6/6 is used because of its advantageous combination of strength, weight and cost. Additionally, a number of other reinforcement materials may also be used such as carbon, ceramics or minerals. Preferably though, glass is used, also because of its strength, weight and cost. Although glass fibers of any suitable length may be employed it is preferably to use relatively long glass fibers having a length of at least about 10 millimeters. Specifically, VERTON RF-7008 EM HS glass reinforced nylon containing 40 percent glass fibers having a length of at least 15 millimeters is preferred.

The plurality of fasteners 14, which as shown number four, are steel or metal. The fasteners each have heads 28 insert-molded or welded, respectively, into the four corner areas 24 of the annular ring 12 and studs 30 extending from the bottom surface 18 of the annular ring 12. Each head 28 is multilobular in shape to provide a greater bonding area between the heads 28 and the plastic of the annular ring 12.

It has been found that the airbag cushion retainer 10 according to the present invention is approximately 40 percent lighter in weight and 40 percent less expensive than a comparable steel or metal airbag cushion retainer. Yet the airbag cushion retainer 10 provides the strength necessary to secure an airbag cushion during inflation thereof.

With reference to FIG. 1, the airbag module assembly 16 includes a module base plate 32, an airbag cushion 34 and an inflator 36. The module base plate 32 has an annular mounting plate with an inner marginal edge 38 forming an inflator-receiving hole 40 and the airbag cushion 34 has an open mouth 42 formed by a collar 44. The collar 44 is positioned adjacent the inner marginal edge 38 of the module base plate 32. The inflator 36 extends through the inflator-receiving hole 40 of the module base plate 32 and the open mouth 42 of the airbag cushion 34, and has a radially extending peripheral bracket 46 positioned adjacent the module base plate 32.

The marginal edge 38 of the module base plate 32 has four fastener-receiving openings 48. The collar 44 of the airbag cushion 34 has four fastener-receiving openings 50 corresponding to the four fastener receiving holes 48 located on the module base plate 32, and the peripheral bracket 46 of the inflator 36 also has four fastener-receiving openings 52 corresponding to the four fastener-receiving holes 48,50 located on the module base plate 32 and the airbag cushion 34, respectively.

The inner periphery 26 of the annular ring 12 fits around the inflator 36 with the bottom surface 18 of the annular ring 12 positioned above the inner marginal edge 38 of the module base plate 32 and superimposed over the collar 44 of the airbag cushion 34. The four corner areas 24 are respectively positioned over the four corresponding fastener-receiving holes 48,50,52 of the collar 44 of the airbag cushion 34, the marginal edge 38 of the module base plate 32 and the peripheral bracket 46 of the inflator 36, with the four studs 30 passing respectively through the corresponding fastener-receiving holes 48,50,52. The fasteners 14 are secured using conventional nuts 54 or other similar means.

Figure 4:
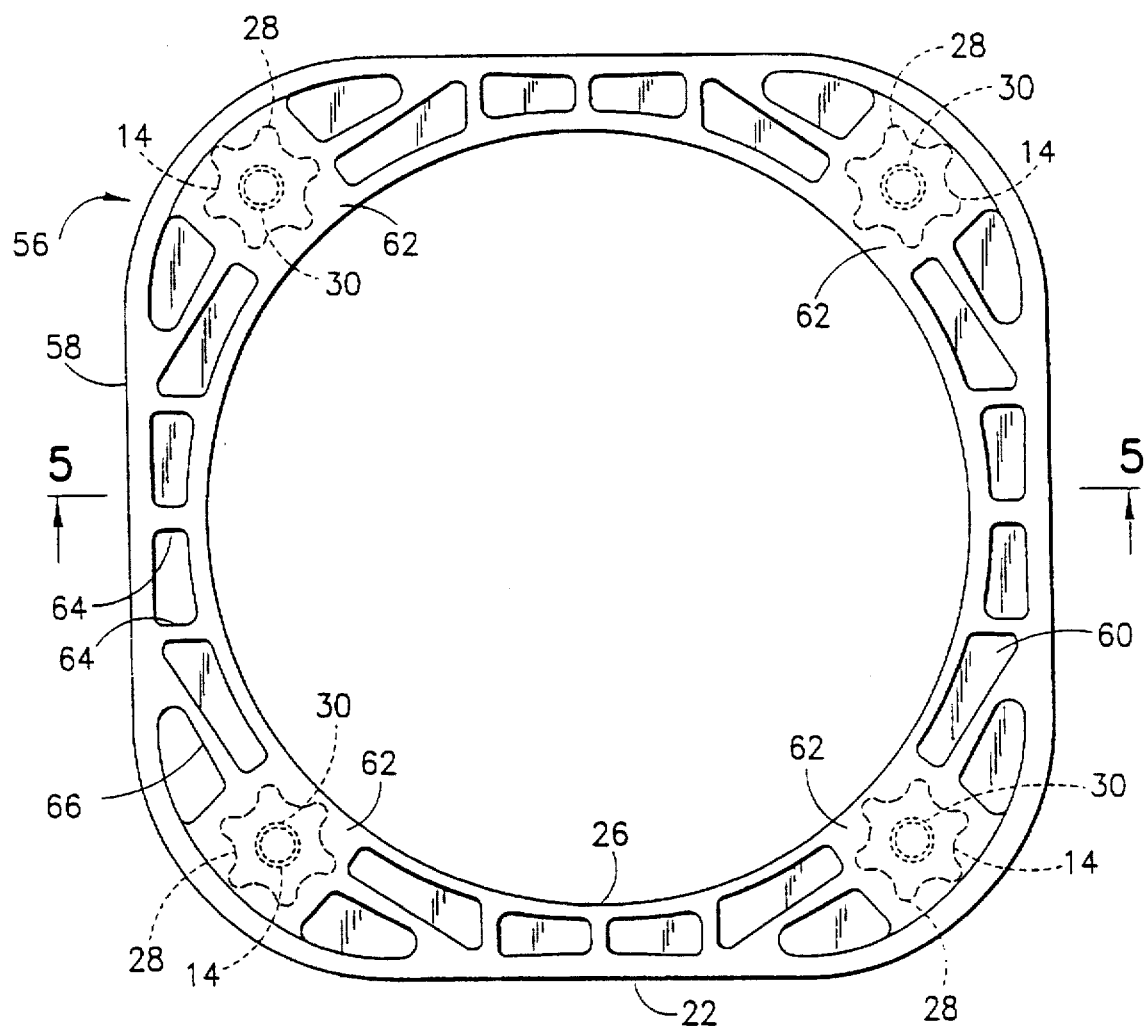
FIG. 4 is a top elevation view of another airbag cushion retainer according to the present invention.
Figure 5:
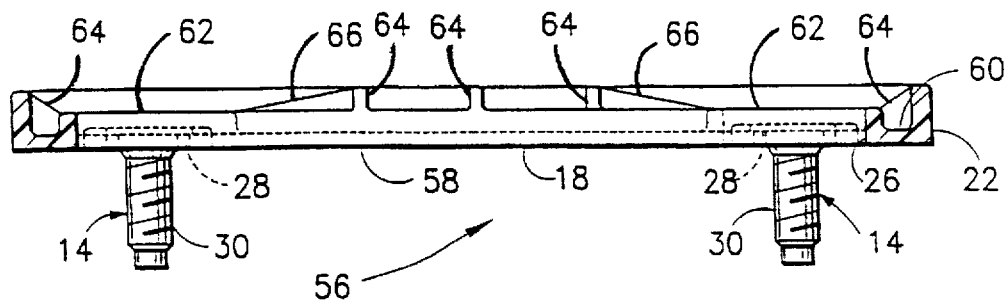
FIG. 5 is a cross-sectional view of the airbag cushion retainer of FIG. 4 taken along the line 5—5 of FIG. 4.

Referring to FIGS. 4 and 5, another airbag cushion retainer 56 according to the present invention is shown. The airbag cushion retainer 56 generally comprises an annular ring 58 and the plurality of fasteners 14. The annular ring 58 is similar to the annular ring 12 described above, being made from the same material and having the bottom surface 18, the generally rectangular outer periphery 22, and the inner periphery 26. The annular ring 58 also includes a relieved top surface 60 and four corner areas 62. The fasteners 14, made of steel or metal, each have multilobular heads 28 insert-molded, respectively, into the four corner areas 62. The annular ring 58 additionally includes a plurality of spaced-apart strengthening ribs 64,66 formed in the relieved top surface 60. The ribs 64,66 provide added strength and rigidity to the annular ring 58.

Figure 6:
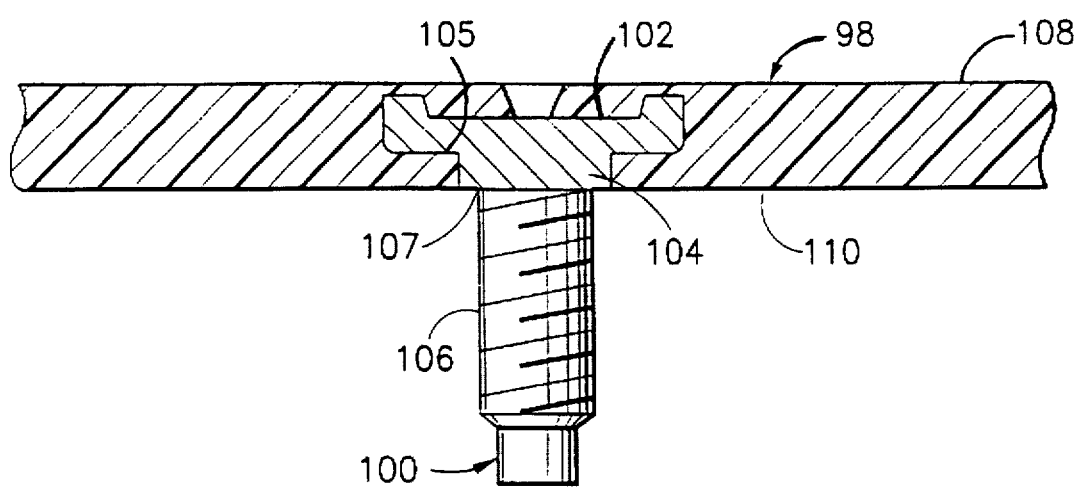
FIG. 6 is a partial cross-sectional view of a second embodiment of a fastener suitable for use in the airbag cushion retainer according to the present invention.

Referring to FIG. 6, another fastener 100 suitable for use in an airbag cushion retainer 98 according to the present invention is shown. The fastener led is preferably formed from steel or metal and comprises a multilobular head 102, a shoulder or spacing collar 104 depending from a bottom surface 105 of the head 102, and a threaded stud 106 depending from a bottom surface 107 of the collar 104. The head 102 and collar 104 are in-molded into the body 108 of the retainer 98 such that the bottom surface 107 of the collar 104 is co-planar with the bottom or exterior surface 110 of the body 108 of the retainer 98. With this structure, the bottom surface 105 of the head 102 of the fastener 100 is spaced from the bottom surface 110 of the body 108 of the retainer 98. The multilobular head 102 is substantially surrounded on its top, bottom and side by the reinforced plastic of the retainer 98 which creates a stronger, more secure anchoring of the fastener head 102 in the body 108 of the airbag cushion retainer 98.

In summary, the present invention provides a light weight, inexpensive, yet strong, one-piece construction airbag cushion retainer with integral fasteners.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An airbag cushion retainer for use in an airbag module assembly including an airbag cushion having an open mouth formed by a collar, the module defining an annular mounting plate for receiving the collar of the airbag cushion, the collar of the airbag cushion and the mounting plate each having a plurality of corresponding fastener-receiving holes, the airbag cushion retainer comprising:

a reinforced plastic annular ring having a bottom surface sized and adapted to be positioned above the mounting plate superimposed over the collar of the airbag cushion; and a plurality of fasteners having heads insert-molded or welded into the reinforced plastic annular ring and studs extending from the bottom surface of the reinforced plastic annular ring, the studs sized and positioned to pass through the corresponding fastener-receiving holes of the collar of the airbag cushion and the mounting plate to secure the airbag cushion to the airbag module assembly and wherein each of the plurality of fasteners further comprises a spacing collar provided intermediate the head and the stud wherein at least a portion of the spacing collar is insert-molded or welded into the annular ring.

2. The airbag cushion retainer of claim 1 wherein the annular ring is made of glass-reinforced plastic.

3. The airbag cushion retainer of claim 2 wherein the annular ring is made of glass reinforced nylon.

4. The airbag cushion retainer of claim 3 wherein the annular ring is made of glass reinforced nylon containing long glass fibers.

5. The airbag cushion retainer of claim 4 wherein the annular ring is made of glass reinforced nylon containing at least about 30 percent long glass fibers.

6. The airbag cushion retainer of claim 5 wherein the annular ring is made of glass reinforced nylon containing at least about 30 percent long glass fibers and the glass fibers having a length of at least about 15 millimeters.

7. The airbag cushion retainer of claim 6 wherein the annular ring further comprises a top surface relieved to remove excess material and reduce the weight of the annular ring.

8. The airbag cushion retainer of claim 7 wherein the annular ring further comprises a plurality of spaced-apart strengthening ribs formed in the relieved top surface.

9. The airbag cushion retainer of claim 8 wherein each head of the plurality of fasteners is multilobular in shape to provide a greater bonding area between the heads and the plastic of the annular ring.

10. The airbag cushion retainer of claim 1 wherein the annular ring further comprises a top surface relieved to remove excess material and reduce the weight of the annular ring.

11. The airbag cushion retainer of claim 10 wherein the annular ring further comprises a plurality of spaced-apart strengthening ribs formed in the relieved top surface.

12. The airbag cushion retainer of claim 11 wherein each head of the plurality of fasteners is multilobular in shape to provide a greater bonding area between the heads and the plastic of the annular ring.

13. The airbag cushion retainer of claim 1 wherein each spacing collar of the plurality of fasteners further comprises a bottom surface, and the bottom surface of the spacing collar is co-planar with the bottom surface of the reinforced plastic annular ring.

14. The airbag cushion retainer of claim 13 wherein the annular ring is made of glass-reinforced plastic and each head of the plurality of fasteners further comprises a top surface, a bottom surface and a side surface extending between the top and bottom surfaces, wherein the top, bottom and side surfaces are surrounded by the glass-reinforced plastic of the annular ring.

15. The airbag cushion retainer of claim 14 wherein each head of the plurality of fasteners is multilobular in shape to provide a greater bonding area between the heads and the plastic of the annular ring.

16. A one-piece construction airbag cushion retainer for use in an airbag module assembly including an airbag cushion having an open mouth formed by a collar, the module defining an annular mounting plate for receiving the collar of the airbag cushion, the collar of the airbag cushion and the mounting plate each having four corresponding fastener-receiving holes, the retainer comprising:

a glass reinforced nylon annular ring, the nylon containing at least about 30 percent long glass fibers, the glass fibers having a length of at least about 15 millimeters, the annular ring having a generally rectangular outer periphery encompassing four corner areas, a generally circular inner periphery, a bottom surface, a relieved top surface, and a plurality of spaced-apart strengthening ribs formed in the relieved top surface, the bottom surface sized and adapted to be positioned above the mounting plate superimposed over the collar of the airbag cushion, with the four corner areas of the annular ring respectively positioned over the four fastener-receiving holes in the collar of the airbag cushion; and four fasteners, each fastener having a multilobular head insert-molded or welded into a respective one of the corner areas of the annular ring and a stud extending from the bottom surface of the annular ring, the studs sized and positioned to pass through the corresponding fastener-receiving holes of the collar of the airbag cushion and the annular mounting plate to secure the airbag cushion to the module assembly and wherein each of the fasteners further comprises a spacing collar provided intermediate the head and the stud wherein at least a portion of the spacing collar is insert-molded or welded into the annular ring.

17. An airbag module assembly comprising:

a module base plate having an inner marginal edge forming an inflator-receiving hole;

an airbag cushion having an open mouth formed by a collar, the collar, the collar positioned adjacent the inner marginal edge of the module base plate;

an inflator having a radially extending peripheral bracket, the inflator extending through the inflator-receiving hole of the module base plate into the open mouth of the airbag cushion with the peripheral bracket located adjacent the module base plate, the collar of the airbag cushion, the marginal edge of the module base plate and the peripheral bracket of the inflator each having a plurality of corresponding fastener-receiving holes; and a one-piece construction airbag cushion retainer having a reinforced plastic annular ring, the annular ring having a bottom surface fitting around the inflator, above the inner marginal edge of the module base plate and superimposed over the collar of the airbag cushion, the retainer further having a plurality of fasteners having heads insert-molded or welded into the annular ring and studs extending from the bottom surface of the annular ring, the studs passing through the corresponding fastener-receiving holes of the collar of the airbag cushion, the marginal edge of the module base plate and the peripheral bracket of the inflator to secure the airbag cushion to the module assembly and wherein each of the plurality of fasteners further comprises a spacing collar provided intermediated the head and the stud wherein at least a portion of the spacing collar is insert-molded or welded into the annular ring.

18. The airbag module assembly of claim 17 wherein the annular ring is made of glass-reinforced nylon containing at least about 30 percent long glass fibers, the glass fibers having a length of at least about 15 millimeters.

19. The airbag module assembly of claim 18 wherein the annular ring additionally comprises a top surface relieved to remove excess material and reduce the weight of the annular ring, and a plurality of spaced-apart strengthening ribs formed in the relieved top surface.

20. The airbag module assembly of claim 19 wherein the plurality of fastener-receiving holes and the plurality of fasteners are all equal to four, the annular ring still further comprising a generally rectangular outer periphery encompassing four corner areas and a generally circular inner periphery, with the four corner areas respectively positioned over the four corresponding fastener-receiving holes of the collar of the airbag cushion, the inner marginal edge of the base plate and the peripheral bracket of the inflator, and the four fasteners located respectively at the four corner areas.

21. The airbag module assembly of claim 20 wherein each head of the plurality of fasteners is multilobular in shape to provide a greater bonding area between the heads and the plastic of the annular ring.

22. The airbag module assembly of claim 17 wherein each spacing collar of the plurality of fasteners further comprises a bottom surface, and the bottom surface of the spacing collar is co-planar with the bottom surface of the reinforced plastic annular ring.

23. The airbag module assembly of claim 22 wherein each head of the plurality of fasteners further comprises a top surface, a bottom surface and a side surface extending between the top and bottom surfaces, wherein the top, bottom and side surfaces are surrounded by the glass-reinforced nylon of the annular ring.

* * * * *